Oct. 22, 1963

H. O. BOSS 3,107,530

TEMPERATURE SENSING APPARATUS

Filed April 6, 1959

INVENTOR.
HAROLD O. BOSS
BY
ATTORNEY.

Oct. 22, 1963 H. O. BOSS 3,107,530
TEMPERATURE SENSING APPARATUS
Filed April 6, 1959 2 Sheets-Sheet 2

INVENTOR.
HAROLD O. BOSS
BY
ATTORNEY.

United States Patent Office 3,107,530
Patented Oct. 22, 1963

3,107,530
TEMPERATURE SENSING APPARATUS
Harold O. Boss, Newport Beach, Calif., assignor to Borg-Warner Corporation, Chicago, Ill., a corporation of Illinois
Filed Apr. 6, 1959, Ser. No. 804,231
8 Claims. (Cl. 73—355)

This invention relates to apparatus for sensing temperatures and more particularly, to means for measuring very small changes in temperature.

Devices heretofore available for providing such functions have not afforded the required sensitivity and accuracy for the measurement of certain critical and perhaps extremely minute variations in heat intensity.

In view of this, it is an object of the present invention to provide apparatus which is extremely sensitive to variations in predetermined temperatures while being relatively unaffected by other variable conditions.

Another object is to provide temperature sensing apparatus which is capable of distinguishing between radiant heat energy and heat energy which is transferred by conduction and convection.

Another object is to provide temperature sensing apparatus as characterized above which can be directed toward a source of radiant heat energy so as to afford indication of the amount of heat radiating therefrom while being substantially unaffected by changes in ambient temperature at said apparatus.

Another object of this invention is to provide apparatus as characterized above which comprises a vibratable element the frequency of vibration of which changes with variations in the amount of radiant heat energy to which it is exposed.

Another object of this invention is to provide apparatus as characterized above which is small, compact and of light weight, while being rugged and dependable in operation.

Another object is to provide apparatus as characterized above which includes means whereby the range of temperatures to which it is sensitive may be readily and conveniently adjusted as desired.

The novel features which I consider characteristic of my invention are set forth with particularity in the appended claims. The apparatus itself, however, both as to its organization and mode of operation, together with additional objects and advantages thereof, will best be understood from the following description of a specific embodiment when read in connection with the accompanying drawings, in which:

Like reference characters indicate corresponding parts throughout the several views of the drawings.

Figure 1:
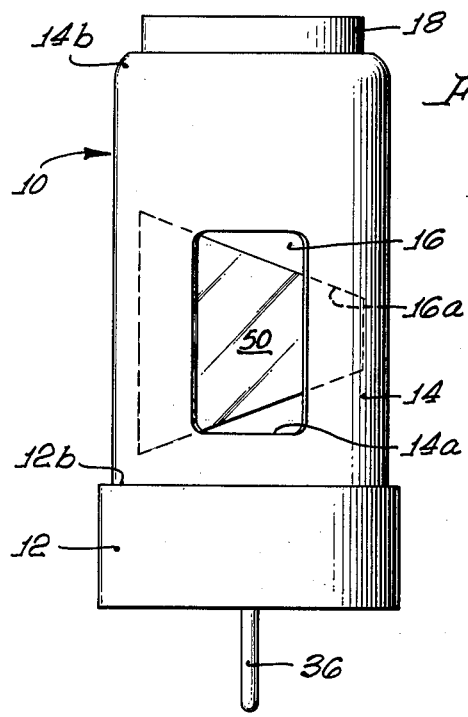
FIGURE 1 is a side elevational view of one embodiment of the present invention.

Referring to FIGURE 1 of the drawings, the embodiment chosen for illustration of the present invention comprises a heat sensitive device 10 having a base member 12 formed of Bakelite, plastic or other suitable insulating material. Base member 12 is formed with a large depression or recess 12a affording an annular shoulder portion 12b. Embedded in shoulder portion 12b so as to be rigidly fixed with respect to base 12 is a substantially tubular cover member 14 provided with an exterior surface, such as polished chrome plating, which is very reflective of radiant heat energy. Formed in the side wall of cover member 14 is a window or opening 14a.

Figure 2:
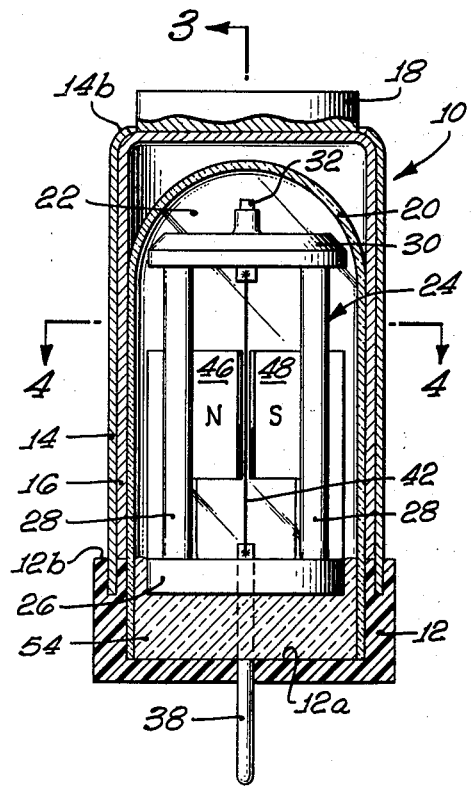
FIGURE 2 is a vertical sectional view through FIGURE 1.
Figure 4:
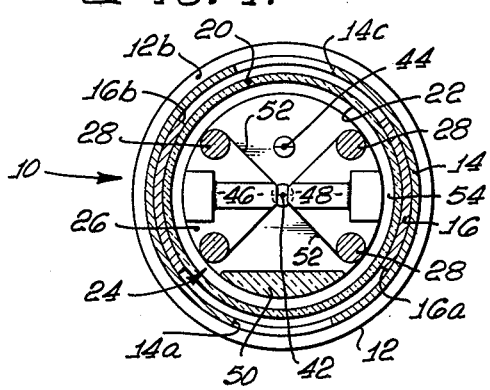
FIGURE 4 is a sectional view taken substantially along line 4—4 of FIGURE 2.
Figure 3:
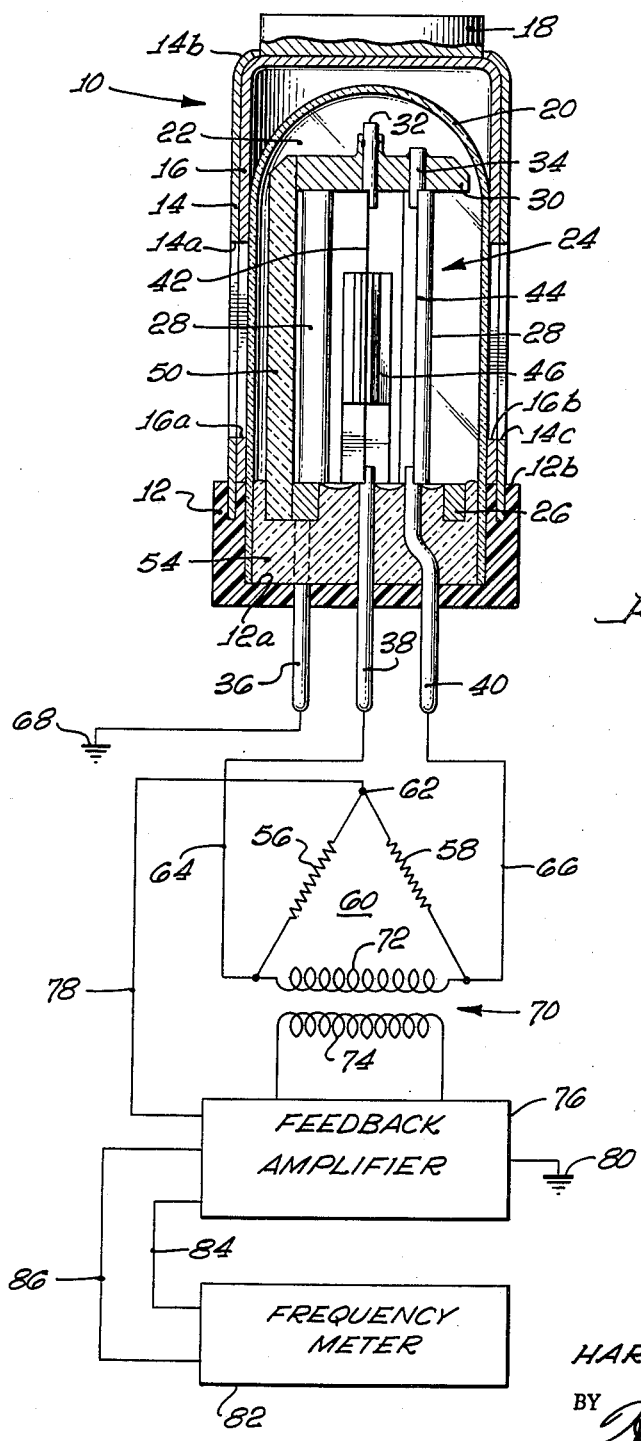
FIGURE 3 is a combined sectional view taken substantially along line 3—3 of FIGURE 2 and a schematic diagram showing certain electronic devices connected in circuit with the novel temperature responsive device.

As shown more clearly in FIGURES 2, 3 and 4, a substantially tubular range adjustment member 16 is concentrically positioned within tubular cover member 14, the lower open end of member 16 resting against the annular shoulder 12b of base member 12 while the closed upper end thereof is loosely engaged by the crimped or spun-over upper end portion 14b of cover member 14. Such construction retains adjusting member 16 within cover 14 while permitting rotational movement of the former with respect to base 12 and said cover member 14. A cylindrically shaped adjusting knob 18 is fixed to the upper closed end of adjusting member 16 and may be provided with a knurled surface to facilitate manual engagement thereof by an operator for rotational movement of adjusting member 16 within cover member 14. Range adjustment member 16 is provided with a trapezoidally shaped opening 16a, shown more clearly in FIGURES 1 and 3, which cooperates with opening 14a in cover 14 to effectively change, during rotation of member 16 the size of the aperture through which heat energy is admitted within device 10, as will hereinafter become more apparent. The members 14 and 16 are each further formed with openings 14c and 16b respectively, which openings cooperate to provide a through opening on the side of device 10 which is opposite the aforedescribed aperture afforded by openings 14a and 16a. Whereas it is intended that openings 14a and 16a cooperate to provide an adjustable inlet for heat energy to device 10, the openings 14c and 16b cooperate to provide an outlet for such heat energy from said device 10.

Within adjusting member 16 is a dome-shaped tubular enclosure 20 formed of glass, quartz or any other substance which is transparent to radiant heat energy, the lower open end portion of enclosure 20 extending within the recess 12a formed in base member 12 to provide a closed chamber 22.

Within chamber 22 is a frame structure 24 comprising an annularly shaped frame base 26, four electrically conductive posts 28 and a support member 30. I prefer to assemble frame 24 into a unitary structure by forming base 26 and support member 30 with suitable openings to receive the ends of posts 28. While in such position, each of the posts is welded, brazed or soldered to both frame base 26 and support member 30, but due to the fact that the frame structure constitutes part of an electrical circuit to be hereinafter described, I prefer to use silver solder for the purpose of insuring high electrical conductivity of the unitary frame structure. Mounted within suitable openings formed in support member 30 are terminal pins 32 and 34.

Depending from the base 12 of heat measuring device 10 are three terminal connectors or prongs 36, 38 and 40. Terminal 36 extends through base member 10 and is mechanically and electrically connected to the annular frame base 26. Each of terminals 38 and 40 also extends through base member 12 of device 10 but is so positioned as to avoid contact with frame base 26 while having a portion exposed within chamber 22 of enclosure 20.

Having its opposite ends mechanically and electrically fixed to terminal pin 32 and the portion of terminal 38 within chamber 22 is an electrically conductive nonmagnetic vibratory element or string 42. String 42 may be a metallic wire or a string formed of quartz or the like and coated with a metallic surface to provide the necessary electrical conductivity. In any event, string 42 is provided with a very uneven or rough surface to provide said string with a high surface to mass ratio, and such surface should be dull black in color as by anodizing to insure maximum absorption by the string of radiant heat energy.

Connected between pin 34 and the portion of terminal 40 within chamber 22 is an electrically conductive static wire 44 for use as one leg of a resistance bridge network to be described hereinafter.

A pair of cooperating magnetic pole members 46 and 48 are disposed on opposite sides of vibratory wire 42, said magnet pole members being secured to frame base 26 to cooperate therewith to provide a substantially U-shaped permanent magnet affording magnetic flux flow transversely of and about string 42.

Positioned between string 42 and the aperture afforded by openings 14a and 16a of cover member 14 and adjustment member 16 respectively, is focusing means 50 for directing onto wire 42 substantially all of the heat energy which passes through such aperture. Such focusing means 50 may take the form of an optical lens which is capable of focusing the heat energy along the vibratory wire 42.

As will become more apparent from the following description of the present invention, it is essential that the heat energy which enters chamber 22 be used substantially exclusively to change the temperature of wires 42 and 44. To prevent such energy from being absorbed by support posts 28, sheets or strips 52 of material having a very reflective surface are wrapped around such posts. I prefer to use aluminum foil and to wrap each strip 52 about two posts and one of the magnet pole members as best shown in FIGURE 4. By virtue of this, the strips 52 cooperate to provide a funnel-like structure for further directing toward wire 42 the heat energy which enters chamber 22.

With the various parts located as above described and as shown in the drawings, the recess 12a of base member 12 is filled with glass 54 or other suitable insulating-sealing means to rigidly secure in place enclosure 20, frame structure 24, terminal prongs 36, 38 and 40, and focusing lens 50. Such glass 54 also serves to hermetically seal enclosure 20 whereby chamber 22 can be substantially evacuated. Such evacuation of chamber 22 is very desirable to further isolate wires 42 and 44 from the effects of changes in ambient conditions surrounding heat measuring device 10.

Referring to FIGURE 3 of the drawings, the temperature sensing device 10 is connected in circuit with resistance elements 56 and 58 so as to provide therewith a resistance bridge network 60. One end of each of resistance elements 56 and 58 are connected together as at juncture 62 while the other ends thereof are connected respectively by conductors 64 and 66 to terminal connectors 38 and 40 respectively. Terminal connector 36 is grounded as at 68.

An output transformer 70 having a primary winding 72 connected across the output terminals of bridge network 60 is provided as shown in FIGURE 3. Output transformer 70 further comprises a secondary winding 74 which is connected to the input terminals of a feedback amplifier 76. A feedback circuit 78 is connected from amplifier 76 to the input of resistance bridge network 60 at juncture 62. Feedback amplifier 76 is grounded as shown at 80.

The output terminals of feedback amplifier 76 are connected in circuit with a frequency indicating device, as for instance, a frequency meter 82, by means of conductors 84 and 86.

It will be noted from the above description that resistance bridge network 60 comprises resistance elements 56 and 58 as upper legs and vibratory wire 42 and static wire 44 of device 10 as lower legs, the wires 42 and 44 being connected in parallel circuit arrangement and grounded at 68 through terminal member 30, posts 28 and frame base 26 of frame structure 24, and terminal connector 36.

In operation, heat measuring device 10 is so positioned with respect to a source of radiant heat energy which it is desired to measure, that the heat energy emanating from such source passes through the aperture afforded by openings 14a and 16a in members 14 and 16 respectively, and the focusing lens 50. Such radiant heat is caused to be localized at vibratory wire 42 by means of the focusing action of lens 50 and the funneling effect of the aluminum strips enclosing posts 28 and magnet core members 46 and 48.

With vibratory wire 42 under an initial state of tension, as established during the initial assembly operation, such wire is caused to vibrate at its natural mechanical frequency dictated by such tension. Such vibration of wire 42 within the permanent magnetic field afforded between magnet pole members 46 and 48 develops a potential across wire 42 which causes current to flow therethrough. Such current flow in wire 42 changes appreciably the reactance of wire 42 as compared with its pure resistance value which constitutes the only reactance effect afforded by such wire when it is in its nonvibratory state. By selecting the proper values for resistance elements 56 and 58, and the proper resistance value for static wire 44 as, for instance, equal to the pure resistance of vibratable wire 42, it is seen that bridge network 60 can be so constructed as to be balanced when wire 42 is not vibrating. Under such condition, when wire 42 is caused to vibrate at its natural frequency, its reactance is changed appreciably, as above described, and bridge network 60 becomes unbalanced so as to cause an output potential to be developed across primary winding 72 of transformer 70. Such output from bridge network 60 is fed, by means of transformer 70, to feedback amplifier 76 where it is amplified in the usual manner. A portion of the signal so amplified is then fed back to the input of bridge network 60 through feedback circuit 78. Such feedback current is caused to flow through the various legs of bridge 60 including vibratory wire 42. The current which flows through wire 42 creates a magnetic field thereabout which reacts with the magnetic flux passing between magnet core members 46 and 48 to create a force on wire 42. By virtue of the fact that the feedback signal is in phase with the mechanical vibration of wire 42, such wire is sustained in vibration at its natural frequency corresponding to the stress or tension thereof.

The output of feedback amplifier 76 is then fed to frequency meter 82 through lead conductors 84 and 86, such meter thereby affording indication of the frequency of vibration of wire 42. Since, as above explained, the natural frequency of vibration of wire 42 varies in accordance with changes in the stress or tension thereof, an accurate indication is thus afforded by meter 82 of all changes in the stress of said wire.

By properly positioning heat sensitive device 10 with respect to a source of radiant heat energy, as above explained, the vibratory wire 42, by virtue of its heat absorbing nonreflective black surface and its high surface to mass ratio, is caused to have its stress changed appreciably by virtue of a change in the amount of heat energy radiating from such source. That is, a change in the amount of heat emanating from the source, causes a change in the temperature of wire 42, such temperature change resulting in a change in stress of said wire by virtue of its tending to expand or contract while its opposite ends are held in fixed supports. Such change in stress of wire 42 causes it to vibrate at a different natural frequency of vibration and, as explained above, such change in frequency of vibration is reflected as a change in the frequency of the signal fed to frequency meter 82, thus providing an accurate indication of the amount of heat absorbed by wire 42 and hence an accurate indication of the amount of heat radiating from the predetermined source.

Since wires 42 and 44 constitute the lower two legs of resistance bridge network 60 and hence are elements the reactances of which are compared to determine the output of bridge 60, static wire 44 has been placed in the same environment as vibratory wire 42 namely, within chamber 22 of enclosure 20. In this manner, only the change in reactance of vibratory wire 42 is reflected as an output from bridge network 60 since both wires 42 and 44 have their resistance values changed to the same extent by the radiant heat energy within chamber 22.

As above described, the aluminum foil, by virtue of its highly reflective surface substantially prevents posts 28 from absorbing any of the radiant heat energy which is admitted to chamber 22. In this manner, the change in tension of wire 42 is not influenced to a substantial degree by expansion or contraction of posts 28 due to change in temperature thereof.

By virtue of the opening or aperture afforded by openings 14c and 16b in members 14 and 16, substantially all of the radiant heat energy which is directionally admitted to chamber 22 and which is not absorbed by wires 42 and 44 is permitted to leave device 10 so as not to destroy the sensitivity and response of temperature sensing device 10. That is, by permitting the radiant heat energy to flow through device 10 at a substantially high rate, the frequency of vibration of wire 42 is caused to more closely follow even small, rapid changes in heat radiating from the predetermined source.

The aforedescribed heat sensitive device 10 is substantially unaffected by changes in ambient temperature by virtue of the aforedescribed evacuation of chamber 22. However, in order to further insure against ambient temperature changes affecting the frequency of vibration of wire 42, I prefer to construct posts 28 of material or combination of materials such that the temperature coefficient of posts 28 is so related to the temperature coefficients of wires 42 and 44 that long range variations in ambient temperature effect such wires and the posts 28 of frame structure 24 in the same manner. In this way, even long range ambient temperature variations fail to significantly influence the frequency of vibration of wire 42.

By manual rotation of range adjustment member 16, the size of the aperture through which radiant heat energy is admitted to chamber 22 can be varied as desired. In this manner, the range of temperatures to be measured can be made to correspond with the desired range of frequencies of vibration of wire 42.

It is thus seen that there has been provided a radiant heat sensitive device which is substantially immune to variations in ambient conditions and which is extremely sensitive and accurate in operation while being small, compact and rugged in construction.

Although I have shown and described a specific embodiment of my invention, I am fully aware that many modifications thereof are possible. My invention, therefore, is not to be restricted except insofar as is indicated by the prior art and by the spirit of the appended claims.

What I claim is:

1. In apparatus for measuring radiant heat energy from a source thereof, the combination of, an enclosure formed of material transparent to radiant heat energy and providing a chamber to be evacuated, radiant heat reflective cover means on said enclosure defining an opening for admitting radiant heat energy from said source to said chamber, a vibratable element within said chamber having a vibration response at a frequency related to the amount of admitted radiant heat energy incident thereon, mounting means for said element applying an initial stress thereto, shielding means associated with said mounting means to substantially prevent heating thereof by radiant energy received from said source and shaped for directing such energy toward said element, and means to vibrate said element at its natural frequency corresponding both to said stress and to the incident radiant heat energy received directly from said source and energy redirected by said shielding means to thereby provide a measure of the heat energy radiating from said source.

2. In apparatus for measuring radiant heat energy from a source thereof, the combination according to claim 1 wherein the opening in the radiant heat reflective cover means is adjustable for controlling the amount of radiant heat energy admitted to said enclosure.

3. In apparatus for measuring radiant heat energy from a source thereof, the combination according to claim 1 wherein the vibratable element is an electrically conductive nonmagnetic string fastened to said mounting means.

4. In apparatus for measuring radiant heat energy from a source thereof, the combination of, an enclosure formed of material transparent to radiant heat energy and providing a chamber to be evacuated, a vibratable element within said chamber having a vibration response at a frequency related to the amount of admitted radiant heat energy incident thereon, mounting means for said element applying an initial stress thereto, shielding means associated with said mounting means to substantially prevent heating thereof by radiant energy received from said source and shaped for directing such energy toward said element, means interposed between said source and said vibratable element to focus on said element heat energy radiating from said source whereby the stress of said element is varied in accordance with variations in radiant heat from said source, and means to vibrate said element at its natural frequency corresponding to its stress to thereby provide a measure of the heat energy radiating from said source.

5. In apparatus for measuring radiant heat energy from a source thereof, the combination of, an enclosure formed of material transparent to radiant heat energy and providing a chamber to be evacuated, radiant heat reflective cover means on said enclosure defining an opening for admitting radiant heat energy from said source to said chamber, a vibratable prestressed element within said chamber having a vibration response at a frequency related to the amount of admitted radiant heat energy incident thereon, shielding means comprising a funnel-like structure disposed within said enclosure and shaped for directing radiant energy toward said element, means interposed between the opening in said cover means and said vibratable element to focus on said element substantially all of the radiant heat energy admitted to said chamber to vary accordingly the stress of said element, and means to vibrate said element at its natural frequency corresponding to its stress to thereby provide a measure of the heat energy radiating from said source.

6. In apparatus for measuring radiant heat energy from a source thereof, the combination according to claim 5 wherein the opening in the radiant heat reflective cover means is adjustable for controlling the amount of radiant heat energy admitted to said enclosure.

7. In apparatus for measuring radiant heat energy from a source thereof, the combination according to claim 5 wherein the radiant heat reflective cover means is provided with a polished chrome exterior surface.

8. In apparatus for measuring radiant heat energy from a source thereof, the combination of, an enclosure formed of material transparent to radiant heat energy and providing a chamber to be evacuated, radiant heat reflective cover means on said enclosure defining an adjustable opening for controlling the amount of radiant heat energy admitted to said chamber, a vibrating prestressed element within said chamber having a vibration response at a frequency related to the amount of admitted radiant heat energy incident thereon, mounting means for said element applying an initial stress thereto, shielding means associated with said mounting means to substantially prevent heating thereof by radiant energy from said source and shaped for directing such energy toward said element, means interposed between the opening in said cover means and said vibratable element to focus on said element substantially all of the radiant heat energy admitted to said chamber to vary accordingly the stress of said element, and means to vibrate said element at its natural frequency corresponding to said stress to thereby provide a measure of heat energy radiating from said source.

References Cited in the file of this patent

UNITED STATES PATENTS

| | | |
|---|---|---|
| 1,475,365 | Schueler et al. | Apr. 11, 1888 |
| 1,099,199 | Parker | June 9, 1914 |
| 2,021,573 | Alder | Nov. 19, 1935 |
| 2,051,320 | States | Aug. 18, 1936 |
| 2,083,317 | Dallenbach | June 8, 1937 |
| 2,120,916 | Bitner | June 14, 1938 |
| 2,447,816 | Rieber | Aug. 24, 1948 |
| 2,447,817 | Rieber | Aug. 24, 1948 |
| 2,645,126 | Hornfleck | July 14, 1953 |
| 2,988,853 | Quereau | Jan. 22, 1955 |